July 28, 1931. C. H. HAPGOOD 1,816,482
MILKING MACHINE
Filed Dec. 24, 1927 3 Sheets-Sheet 1

WITNESS:

INVENTOR
Cyrus Howard Hapgood
BY
ATTORNEYS.

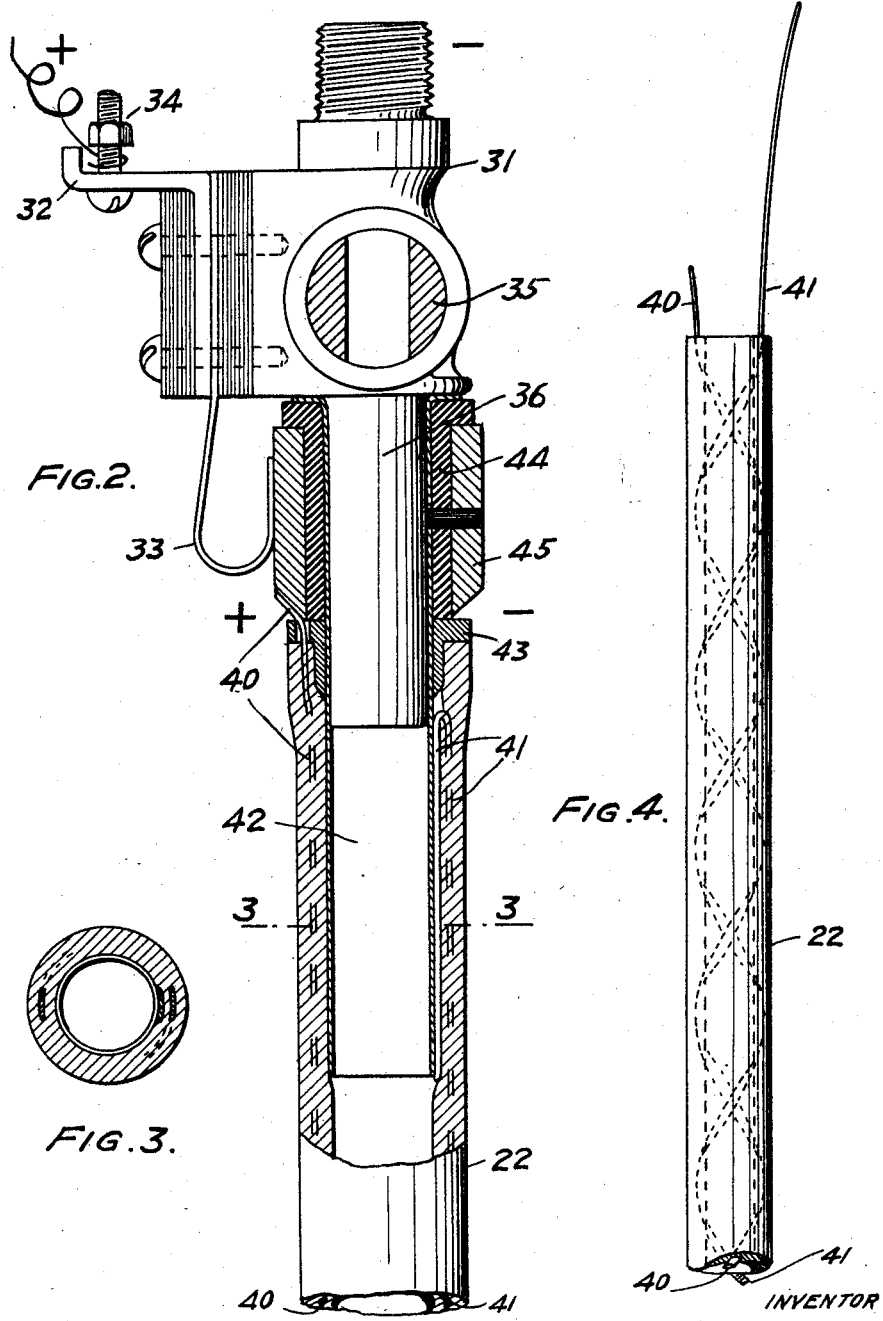

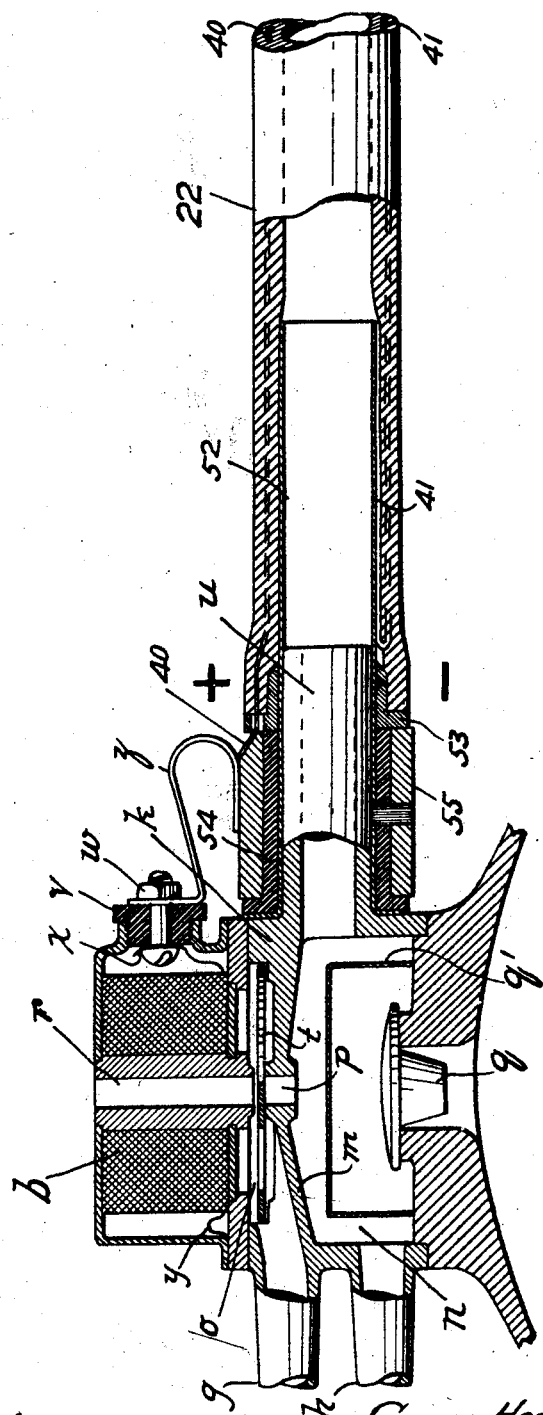

Patented July 28, 1931

1,816,482

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

MILKING MACHINE

Application filed December 24, 1927. Serial No. 242,329.

It is known in the art to provide a milking machine comprising a double-chambered teat cup, a pulsation pipe and a secondary pneumatic pulsator connected with, and controlled in its operation by the pulsations in, said pipe, and connected with, and producing pulsations in, the outer chamber of the teat cup, and to provide a vacuum and milk pipe connection from the inner teat cup chamber through the milk claw to the milk pail. It is also known, in such a construction, to provide a vacuum pipe line from the milk pail to the vacuum pump, a primary pneumatic pulsator adapted to produce pulsations in a pipe connected with the secondary pulsator, and electrically operated means, controlled from the pump, for operating the primary pneumatic pulsator. The pulsations from the primary pneumatic pulsator may convey pulsations direct to the outer teat cup chamber, but it is distinctly preferable to provide two pneumatic pulsators, one, a primary pulsator, being directly operated by the electrically operated means and in turn operating another, or secondary pulsator, which produces the pulsations that are conveyed to the outer teat cup chamber. Such a milking machine is disclosed in the Daysh and Hapgood Patent No. 1,405,104, dated January 21, 1922.

In an application filed by me November 17, 1926, Serial No. 148,787, I set forth an improvement on the Daysh-Hapgood invention which comprises a casing mounted on the milk pail and having a port connecting with a vacuum chamber, a port connecting with a source of higher pressure, conveniently the atmosphere, and a port connected with the pulsation pipe that effects, or controls, the pulsations in the pulsation chambers of the teat cups, and a valve which is so controlled by an intermittently energized electromagnet as to connect the pulsation pipe alternately with the vacuum port and the air port.

The present invention has for its object to still further improve the Daysh-Hapgood invention, in which, preferably but not necessarily, the improvement devised by me is also utilized, by providing means whereby, when opposite ends of a hose or other conduit are connected respectively with the vacuum chamber on the milk pail and with the vacuum pipe line, the electric pulsation circuit to the electromagnet will be automatically closed. The invention comprises other features that are hereinafter fully described.

In the drawings, which show one preferred embodiment of the invention:

Fig. 2 is a longitudinal sectional view through an end of the hose adapted for connection with the vacuum pipe and of the connections between said hose and the valve for controlling the flow of air from the hose to the vacuum pipe.

Fig. 3 is a section on the line 3—3 of Fig. 2.

Fig. 4 is a view of one end of the hose and of the wires carried thereby forming part of the electric circuit.

Fig. 5 is a sectional view of that part of the milking machine unit that is mounted on the pail, the hose detachably connected therewith, and the connections between the hose and unit.

Figure 1:
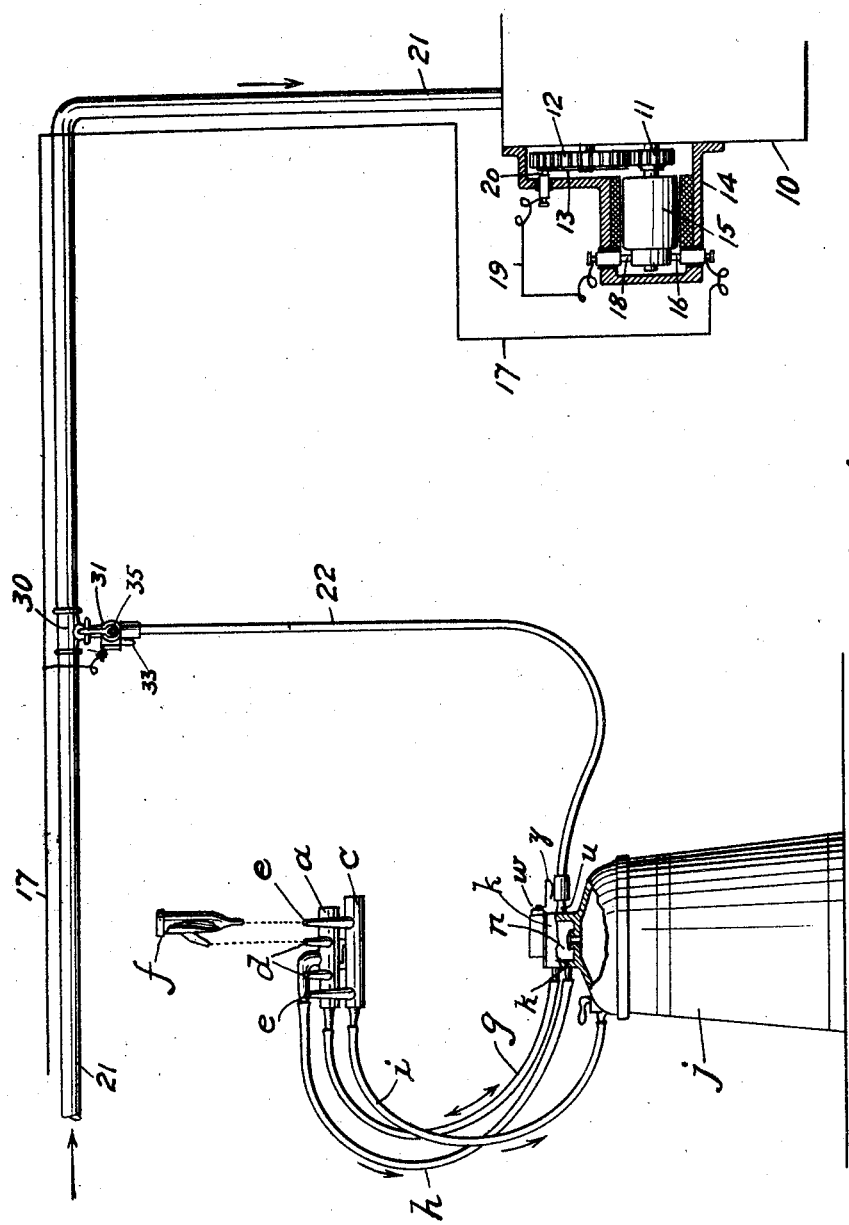
Fig. 1 is a side elevation, partly in section, of a complete milking machine.

The secondary pneumatic pulsator (which is preferably but not necessarily employed) may be of the construction shown in the Leitch Patent No. 1,255,186, dated February 5, 1918. It comprises (see Fig. 1) a pulsator chamber $a$ communicating with a pulsation pipe $g$ and with a vacuum pipe $h$ and having nipples $d$ adapted for connection with the pulsation chambers of the teat cups $f$; a pulsator valve in said chamber and operable by pneumatic pulsations communicated through pulsation pipe $g$; and a milk chamber $c$ communicating with a milk pipe $i$ and having nipples $e$ adapted for connection with the milk chambers of the teat cups $f$. Milk pipe $i$ connects with the interior of milk pail $j$.

On a cover of milk pail $j$, and preferably detachable from such cover, is a casing $k$ divided by a web $m$ into chambers $n$ and $o$. The lower chamber $n$ is under constant vacuum and communicates, though check valves $q$ and $q'$ with the interior of the milk pail. Vacuum chamber $n$ has a nipple adapted for connection with pipe $h$. Chamber $o$ has a nipple adapted for connection with pulsation pipe $g$. In web $m$ is a port $p$ affording communication between chambers $n$ and $o$. Above chamber $n$ is a vertical tube $r$ affording a port communicating with chamber $o$ and open to the atmosphere. A disc valve $t$ is movable either into position (as shown) to close port $p$ and open port $r$ or into position to close port $r$ and open port $p$. Valve $t$ thus acts as a pulsator, in that it opens pipe $g$ to connection alternately with atmosphere and with suction.

Surrounding tube $r$ is the field winding of an iron-enclosed magnet $b$. Valve $t$ functions also as the armature of the magnet. The circuit to the magnet is alternately opened and closed, as is hereinafter fully described. When the magnet is energized, valve $t$ is raised. When the magnet is de-energized, valve $t$ is free to drop by gravity, but its downward movement is positively insured by the constant suction on its lower face.

Vacuum chamber $n$ has a nipple $u$, which is detachably connected with a vacuum pipe line from a vacuum pump as hereinafter described.

The casing of the magnet is provided with a threaded orifice that receives a plug $v$ of insulating material. Through the plug extends a bolt $w$ which acts as a binding post for one terminal $x$ of magnet $b$. The other terminal $y$ of magnet $b$ is grounded on the casing $k$.

The shaft of the vacuum pump 10 (which may be of the type shown in the Leitch Patents 1,367,554 and 1,378,881 and the Hall Patent No. 1,374,650 and is diagrammatically shown in Fig. 1) has a pinion 11 which is in driving connection with a gear 12 carrying a semi-circular contact strip 13. Affixed to the pump casing is a casing 14 enclosing an electric generator 15 as well as pinion 11 and gear 12. When the milking machine is in operation, one of the brushes 16 of the generator is connected, through an electric conducting line 17 and other connectors, with the binding post $w$, as hereinafter described. The other brush 18 of the generator is connected, through an electrical connection 19, with a brush 20 carried on the pump casing and adapted, in the rotation of gear 12, to intermittently contact with strip 13, from which, through the pump casing, the current flows through the vacuum pipe line 21 and thence, as hereinafter described, to casing $k$.

In the present invention a separable branch pipe or hose 22 is provided for connecting the vacuum pipe 21 with the nipple $u$ in order to establish suction in the chamber $n$, and hose 22 is provided with such electrical connections, and the connections between one end of hose 22 and nozzle $u$ and between the other end of hose 22 and pipe line 21 are such, that the establishment of vacuum connections between vacuum pipe 21 and chamber $n$ also establishes a closed electric connection between conductor 17 and binding post $w$ and between the casing $k$ and vacuum pipe 21.

Vacuum pipe 21 is provided with any desired number of T-couplers 30, one arm of the couplers carrying a valve casing 31. Carried by and insulated from the valve casing are a bracket 32 and a flexible and elastic contact finger 33. Bracket 32 carries a binding post 34, by which the conductor 17 is secured to the bracket. Casing 31 carries a nozzle 36 and affords communication between pipe line 21 and nozzle 36 by means of a valve 35 in the casing.

Hose 22 is provided with conducting wires 40 and 41 extending spirally along the hose. Hose 22 also carries, and encloses one end of, a metal tube 42 which projects beyond the end of the hose and at its free end is provided with a flange adapted to abut against casing 31 when tube 42 is slipped on nozzle 36.

Secured to the end of hose 22 and sleeved on tube 42 is a ring 43 of insulating material provided with a hole through which projects one end of wire 40. On the projecting end of tube 42 is a sleeve 44 of insulating material, and sleeved on sleeve 44 is a conductor 45 having a bevelled end in electrical connection with the projecting end of wire 40, and whose exterior face is adapted to engage contact finger 33 when hose 22, with its attached parts, is slipped on nozzle 36.

The end of wire 41 is bent back and extends longitudinally along and in contact with the end of tube 42 that is embedded in the end of hose 22.

It is clear that when hose 22 is attached to valve casing 31, an electrical connection is established from wire 40, through conductor 45, finger 33 and bracket 32, to conductor 17; and that another electrical connection is established from wire 41, through tube 42, nozzle 36, valve casing 31 and coupler 30, to vacuum pipe 21.

A similar construction is provided at the opposite end of hose 21. That is, it carries a tube 52 in electrical contact with wire 41 and adapted to engage nozzle $u$, an orificed ring 53 through which extends the end of wire 40, a sleeve 54 of insulating material, and a conductor 55 adapted to connect wire 40 with a flexible contact finger $z$ secured to binding post $w$.

From the foregoing description, it will be apparent that when the opposite ends of hose 22 are respectively connected with nozzle u and nozzle 36, so as to connect the milking unit with the vacuum line, a complete electrical circuit is established through the generator 15 and magnet b, and that as soon as cock 35 is opened, the milking machine will operate.

The wire 40, as shown, is formed, preferably, in the shape of a braid or tape, in that it is preferably wide and thin in cross-section, thereby imparting to the wire more flexibility than the ordinary wire that is round in cross-section. The wire may be, if desired, substantially thinner in cross-section than is shown in the drawing. Preferably, also, the wire should extend spirally along the hose, so as to readily flex with the hose, or it should possess sufficient inherent flexibility to accommodate itself to the bending of the hose.

My invention dispenses with the necessity of providing any special means for manually closing the electric pulsation circuit, this being accomplished automatically by connecting the hose with the milking machine unit and the vacuum pipe; and the milking machine will operate as soon as cock 35 is opened. Aside, however, from this automatic closure of the electric circuit, the described construction, or such modification thereof as is within the skill of the mechanic, exhibits substantial novelty and possesses substantial advantages.

Having now fully described my invention, what I claim and desire to protect by Letters Patent is:

1. In a milking machine, the combination with a milking machine unit comprising a pulsation pipe, means forming a vacuum chamber, and an electromagnet adapted, when intermittently actuated, to connect said pulsation pipe alternately with said vacuum chamber and a source of higher pressure; of a vacuum pipe line and means to create suction therein, a separate hose adapted to connect the vacuum chamber of the milking machine unit with said vacuum pipe, an electric generator, an electric circuit, and means to create electric pulsations therein; said electric circuit comprising terminals connected with opposite poles of the magnet, terminals connected with opposite poles of the generator, and two wires carried by and extending along the hose; and means adapted, when the opposite ends of said hose are connected respectively with said vacuum chamber and vacuum pipe, to electrically connect the ends of said wires at one end of the hose to the respective magnet terminals and the other ends of said wires at the other end of the hose to the terminals connected with the generator.

2. In a milking machine, the combination with a milking unit comprising teat cups, an air pulsation pipe controlling pulsations therein, means providing a vacuum chamber and a nozzle communicating therewith, and an electromagnet adapted, when intermittently actuated, to connect said pulsation pipe alternately with said vacuum chamber and a source of higher pressure; of a vacuum pump, a vacuum pipe connected therewith, a nozzle adapted to communicate with said vacuum pipe, an electric generator, an electric circuit, means to create electric pulsations in said circuit, and a separate hose adapted to connect said nozzles and thereby connect the milking unit with said vacuum pipe; said electric circuit comprising terminals, one of which is the first named nozzle and the other of which is adjacent thereto, connected with opposite poles of the magnet, and terminals one of which is the second named nozzle and the other of which is adjacent thereto, connected with opposite poles of the generator, and two conducting wires carrier by and extending along the hose, and means adapted, when the hose is applied to said nozzles, to electrically connect two corresponding ends of said wires to said magnet terminals and the other two corresponding ends of the wires of said terminals connected with the generator.

3. In a milking machine, the combination with a milking machine unit comprising a pulsation pipe, means forming a vacuum chamber, and an electromagnet adapted, when intermittently actuated, to connect said pulsation pipe alternately with said vacuum chamber and a source of higher pressure; of a vacuum pipe line and means to create suction therein, a nozzle adapted to communicate with said vacuum pipe, a nozzle adapted to communicate with said vacuum chamber, a separate hose, an electric generator, an electric circuit and means to create electric pulsations therein, said electric circuit comprising an electrical connection between one pole of the magnet and the first named nozzle and an electrical connection between one pole of the generator and the second named nozzle, said electric circuit comprising also wires carried by said hose, tubes carried at opposite ends of said hose and with which one of said wires is connected at opposite ends and conductors carried at opposite ends of said tube and with which the other of said wires is connected at opposite ends, said tubes being adapted to engage their respective nozzles and at the same time to electrically connect one conductor with the other pole of the magnet and the other conductor with the other pole of the generator.

4. In a milking machine, the combination with a milking machine unit comprising a pulsation pipe, means forming a vacuum chamber, and an electromagnet adapted, when intermittently actuated, to connect said pulsation pipe alternatively with said vacuum chamber and a source of higher pressure; of a vacuum pipe line and means to create suction therein, a nozzle adapted to communicate with said vacuum pipe, a valve casing, a finger carried by the valve casing, a valve controlling the flow of air through said nozzle to the vacuum pipe, a nozzle adapted to communicate with said vacuum chamber, a separate hose, an electric generator, an electric circuit and means to create pulsations therein, said electric circuit comprising an electrical connection between one pole of the magnet and the first named nozzle, an electrical connection between one pole of the generator and the second named nozzle and an electrical connection between the other pole of the generator and said finger, said electric circuit comprising also wires carried by said hose, tubes carried on opposite ends of said hose and with which one of said wires is connected at opposite ends, and conductors carried at opposite ends of said tube and with which the other of said wires is connected at opposite ends, said tubes being adapted to engage their respective nozzles and at the same time to electrically connect one conductor with the other pole of the magnet and the other conductor with the finger on the valve casing.

5. In a milking machine, the combination with means, including a vacuum chamber, an electro-magnet and a valve, adapted, when the magnet is intermittently actuated, to produce pneumatic pulsations, of a vacuum pipe line, a hose adapted for pneumatic connection at opposite ends with the vacuum pipe line and the vacuum chamber respectively, two wires carried by the hose, an electric circuit, and means adapted, when one end of the hose is connected to said vacuum pipe, to connect said wires with opposite poles of said circuit, and means adapted, when the other end of the hose is connected to said vacuum chamber, to connect said wires with opposite poles of the magnet.

6. In a milking machine, the combination with means, including a vacuum chamber, an electro-magnet and a valve, adapted, when the magnet is intermittently actuated, to produce pneumatic pulsations, a nozzle communicating with the vacuum chamber and a finger adjacent the nozzle, opposite poles of the magnet being in electric connection respectively with said nozzle and finger; of a vacuum pipe line, a nozzle thereon and a finger adjacent the nozzle; an electric generator and electric connections from opposite poles thereof to the last named nozzle and finger respectively; a hose, two wires carried thereby and a tube and a conductor at each end of the hose and in electric connection with the respective wires; the tube and conductor at one end of the hose being adapted to engage and electrically connect with the first named nozzle and finger respectively, and the tube and conductor at the other end of the hose being adapted to engage and electrically connect with the second named nozzle and finger respectively.

7. The combination, with a pneumatic chamber, a finger carried by and insulated from said pneumatic chamber, an electric unit opposite poles of which are in electrical connection with said pneumatic chamber and finger respectively, and a nozzle on said pneumatic chamber, of a detachable hose, two wires carried thereby, a tube carried by the hose and in electrical connection with one of said wires and adapted to engage said nozzle, a sleeve of insulating material on said tube, and a conductor sleeved on said insulating sleeve and in electrical connection with the other wire and adapted to engage said finger when said tube is engaged with said nozzle.

8. The combination, with a pneumatic chamber, an electro-magnet one pole of which is in electrical connection with said chamber, a finger in electrical connection with the other pole of said magnet, and a nozzle projecting from said chamber, of a hose, two wires carried thereby, a tube carried by the hose and in electrical connection with one of said wires and adapted to engage said nozzle, a sleeve of insulating material on said tube, and a conductor sleeved on said insulating sleeve and in electrical connection with the other wire and adapted to engage said finger when said tube is engaged with said nozzle.

9. The combination with a vacuum pipe, of a valve chamber carried by and in pneumatic connection with said vacuum pipe, a finger supported on and insulated from said valve chamber, an electric circuit opposite poles of which are in electrical connection with said vacuum pipe and finger respectively, a nozzle on the valve casing, a hose, two wires carried thereby, a tube carried by the hose and in electrical connection with one of said wires, a sleeve of insulating material on said tube, and a conductor sleeved on said insulating sleeve and in electrical connection with the other wire and adapted to engage said finger when said tube is engaged with said nozzle.

In testimony of which invention, I have hereunto set my hand, at New York city, New York, on this 19th day of December, 1927.

CYRUS HOWARD HAPGOOD.